INVENTORS:
CHARLES W. HARGENS, III
RICHARD H. FIELD
BY Howson & Howson
ATTYS.

INVENTORS:
CHARLES W. HARGENS, III
RICHARD H. FIELD
BY Howson & Howson
ATTYS.

INVENTORS:
CHARLES W. HARGENS, III
RICHARD H. FIELD
BY
Howson & Howson
ATTYS.

United States Patent Office 3,452,589
Patented July 1, 1969

3,452,589
APPARATUS FOR MEASURING STRESS-STRAIN
CHARACTERISTICS
Charles W. Hargens III, Philadelphia, and Richard H. Field, Bromall, Pa., assignors to The Pennsylvania Lions Sight Conservation and Eye Research Foundation, Inc., Harrisburg, Pa., a corporation of Pennsylvania
Filed Apr. 22, 1966, Ser. No. 545,231
Int. Cl. A61b 9/00
U.S. Cl. 73—80
25 Claims

ABSTRACT OF THE DISCLOSURE

An electromechanical palpator for measuring the dynamic stress-strain characteristics of an eye is provided, including an eye contactor adapted to contact the eye and means for urging the contactor against the eye with a varying force. Means is provided for simultaneously measuring the varying force applied to the contactor and the varying displacement of the contactor produced by the force as the force varies.

The present invention relates to an electromechanical palpator and particularly to a system suitable for measuring the dynamic stress-strain characteristics of a living eye.

There are many applications in which it is desirable to determine a dynamic characteristic for a living eye representing the nature of the variation of strain produced by applied stresses, hereinafter called a stress-strain characteristic. Various diseases of the eye are accompanied by conditions of abnormal internal pressure, such as glaucoma which is caused by the build-up of excessive intraocular pressure from the fluids within the eye. Glaucoma is one of the principal abnormal conditions of the eye involving abnormal pressure and is the eye disease to which most attention is given by clinical and public health programs. In order to measure intraocular pressure of the eye, various palpation techniques have been developed. Palpation is a medical term for a diagnostic procedure in which response of an organ to manipulation is used to determine the softness of the organ, such as the eye. Many mechanical palpators have been designed to determine intraocular pressure and for the most part these instruments are known as tonometers. Some of the tonometers in recent years have employed complex arrangements of automatic force-balancing circuits. The principle used in most of these devices is to apply a known force and the simultaneous measurement of the resulting displacement. The displacement observed from the application of the known forces may be microscopic in the automatic force-balancing tonometers, but in the standard mechanical tonometers, such as the Schiotz tonometer, the displacement may be a millimeter or more.

In the previously known electromechanical palpators and tonometers, only a single value of force or pressure is correlated with the resulting displacement caused. If the specimen being tested has linear, time-independent characteristics like a spring, the measurement will yield a useful numerical spring constant. However, the eye exhibits time-dependent characteristics which are not revealed by applying a single value of force and measuring resulting displacement. The previously known instruments do not measure a dynamic functional relationship between force and displacement corresponding to stress and strain of the eye.

In contrast to the previously known instruments, the present invention makes possible the recording of the dynamic stress-strain function of the eye. The present invention is important not only for its use in detection of glaucoma but will find other important applications in other medical research and diagnosis.

In accordance with the invention for measuring the dynamic stress-strain characteristics of an eye, an eye contactor is provided which is adapted to contact the eye. Means is employed for urging the eye contactor against the eye with a varying force. There is provided means for simultaneously measuring the varying force applied to the eye contactor and the varying displacement of the contactor produced by the force as the force varies. The simultaneously measured values of force and displacement, corresponding to stresses applied to the eye and the resulting strain of the eye, may be used to provide the dynamic stress-strain function of the eye for the varying force applied.

Preferably, the means for applying the varying force includes an actuator for applying the varying force in a cyclic manner. The cyclic manner of applying the varying force is especially desirable where viscoelastic substances are concerned, such as the eye. The rheological response of a viscoelastic substance depends upon the application rate of the forcing function. If the material is Hookean in nature, force and deformation will be in phase; whereas if the material is Newtonian in nature, a time lag in deformation response will result. A sinusoidal or cyclic forcing function in accordance with the present invention is used to show these differences since it may be advantageously employed to facilitate displaying the phase shift of the displacement of the eye associated with a cyclic application of the varying force.

In accordance with the invention, the cyclic application of the varying force during a predetermined interval of time enables an accurate and new method of determining the stress-strain characteristics of the eye. By employing an eye contactor which is acted upon in this manner to move against the eye, the varying force applied may be measured to provide an indication of the stress applied to the eye, and the corresponding displacement of the eye contactor may be measured to provide an indication of the resulting strain of the eye. Through a suitable plotting device the dynamic stress-strain function of the eye may be displayed for the varying force applied.

In the preferred embodiment of the invention, the varying force is applied to the contactor by resilient means, and the measurement of the magnitude of the varying force applied to the eye is a measurement of the deformation of the resilient means. The resilient means in accordance with the present invention provides an accurate arrangement for measuring even small values of force applied to the eye and its response is independent of the attitude of the palpator.

For a better understanding of these and other features and advantages of the present invention, reference is made to the following description and the accompanying drawings, in which.

Figure 1:
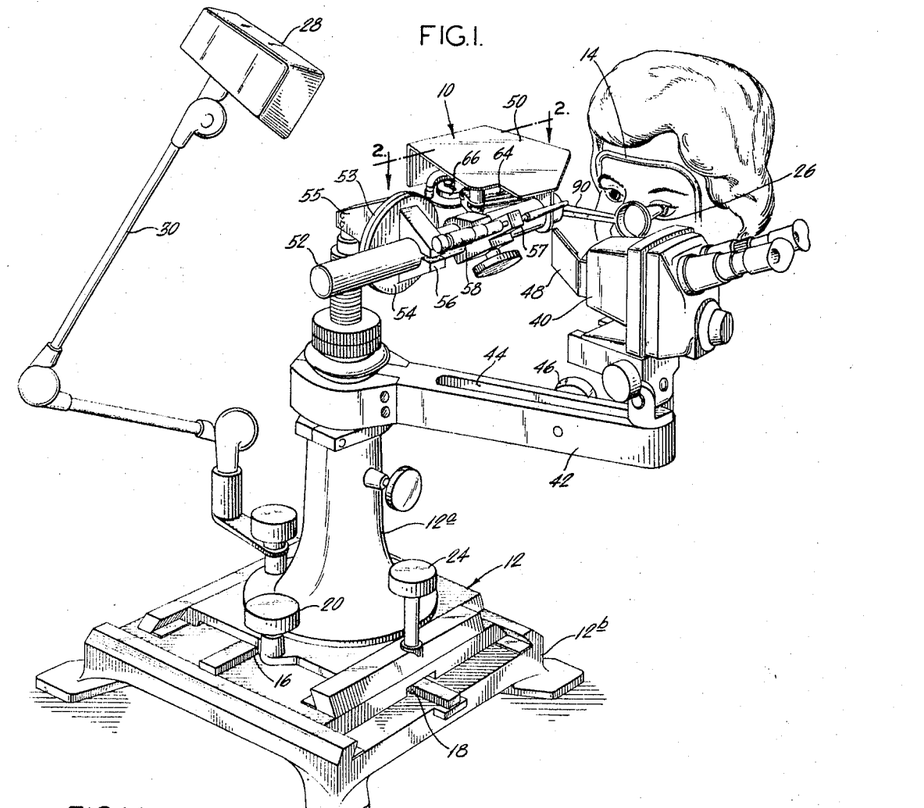
FIG. 1 is a perspective view showing a device embodying the present invention in use on the eye of a subject in erect or sitting position.

Referring now to the embodiment of the invention illustrated in FIG. 1, the invention is shown in use on the eye of a patient or subject. The electromechanical palpator generally designated 10 for measuring the dynamic stress-strain characteristics of the eye is shown supported by a stand generally designated 12. The patient may be in an erect or sitting position when the measurements are being made with the patient's head being held in a frame 14, which is in a fixed position relative to the stand. Support column 12a of stand 12 is adjustable relative to its base 12b by two mutually perpendicular and horizontally oriented rack and pinion arrangements generally designated 16 and 18 so that the palpator 10 can be accurately positioned in contact with the patient's eye. Rack and pinion arrangement 16 is operated by hand knob 20 to move support column 12a toward or away from the patient and rack and pinion arrangement 18 is operated by hand knob 24 to move support column 12a laterally with respect to the patient.

Figures 4, 5, 6, 7:
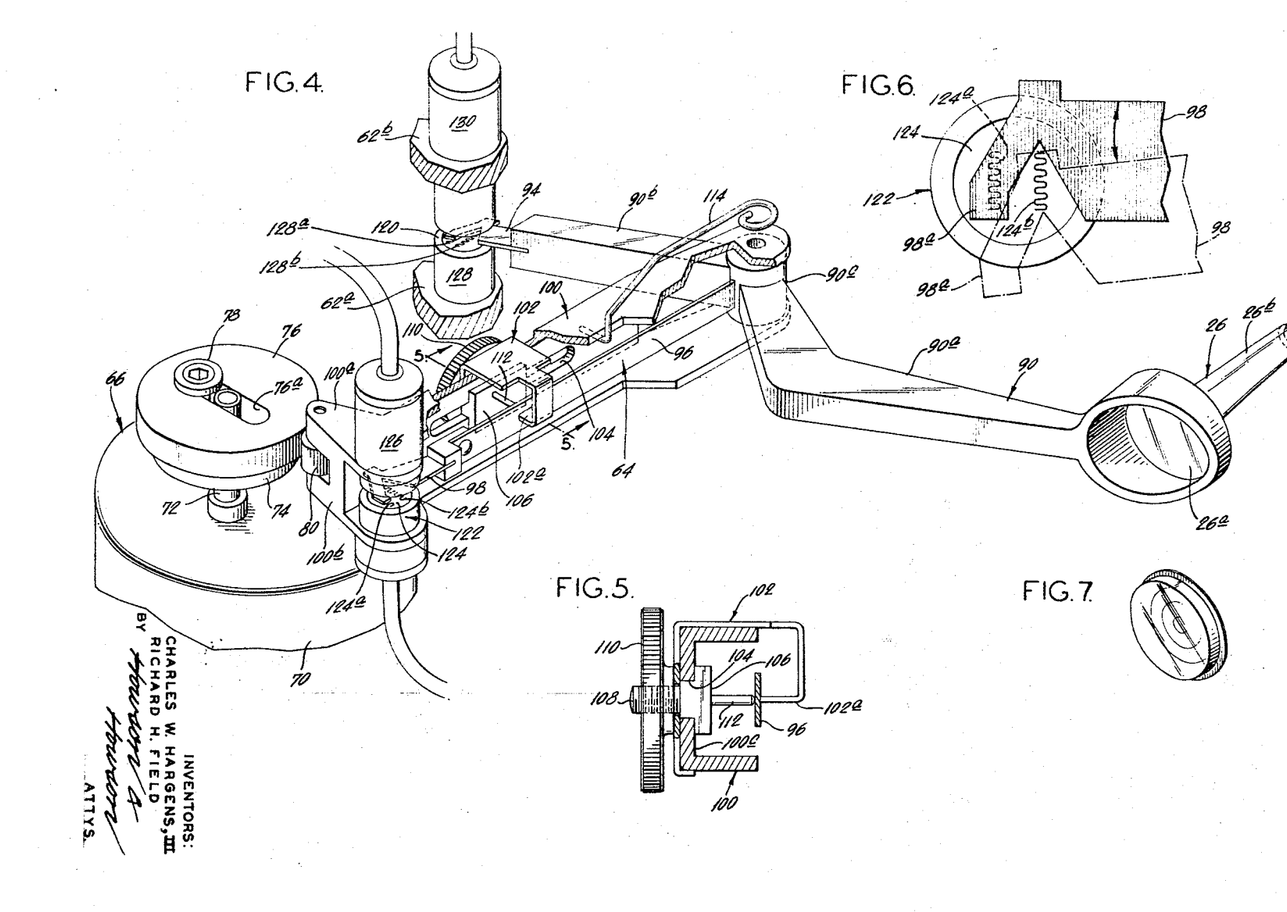
FIG. 4 is an enlarged perspective view with parts broken away illustrating the electromechanical palpator used in the device of FIG. 1 for measuring stress-strain characteristics.
FIG. 5 is a sectional view taken along line 5—5 of FIG. 4.
FIG. 6 is an enlarged plan view of the optical shutter and photosensor used in the palpator of FIG. 4 and showing the optical shutter in alternative positions.
FIG. 7 is a perspective view of an alternative form of an eye contacting element suitable for use in the palpator of FIG. 1.
Figure 13:
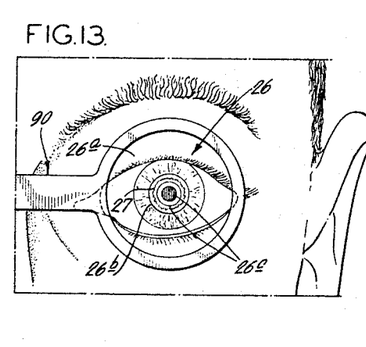
FIG. 13 is a schematic illustration of a human eye as viewed through an eye contacting element in contact with the eye.

Electromechanical palpator 10 employs a transparent eye contacting element 26 which permits viewing of the eye through the eye contacting element. In the present instance, eye contacting element 26, which may be made of Lucite or other suitable transparent material, comprises a generally circular portion 26a, as shown in FIGS. 1 and 4, supported by the palpator and a frustoconical portion 26b extending outwardly to contact the eye of the patient. The frustoconical portion 26b facilitates contacting the eyes of the patients whose eyes are deeply set in their heads. The end of the frustoconical portion is provided with a series of concentric rings 26c, as shown in FIGS. 4 and 13, which are engraved on the end of the eye contacting element to help the operator center the element at some desired area of contact on the eye, which is somewhat convex requiring centering of the eye contacting element for consistency of measurement. FIG. 13 is a schematic illustration of an eye as viewed through eye contacting element 26 in contact with the eye. The portion 26b of the eye contacting element is of sufficient diameter to prevent indentation of the eye. The perimeter circle 27 (see FIG. 13) of the liquid area of the eye contacted by portion 26b is preferably positioned within the concentric rings 26c. In viewing the eye through the transparent eye contacting element, the concentric rings also provide an indication of the degree of applanation of the eye and are useful in aligning the axis of the eye contacting element with the axis of the cornea. With some patients a flat transparent eye contacting element having concentric circles engraved on the eye contacting side, as shown in FIG. 7, may be used instead of the contacting element 26. Other varied configurations of the eye contacting element may be used as desired. In the use of the palpator, a few drops of a topical anesthetic are deposited on the eye of the patient before contact is made with the eye by the eye contacting element.

As shown in FIG. 1, a lamp 28 is supported by a suitable adjustable support arm 30 attached to the stand 12 for directing light through the eye contacting element. For accurate viewing of the eye contacted by the eye contacting element, a microscope 40 is supported on an arm 42 attached to stand 12. In the present instance, the microscope is adjustable in position along the arm by being held in a clamping slot 44, the sides of which may be moved toward each other to grip the support for the microscope at any desired position along the slot through adjustment of screw wheel 46. A mirror 48 is shown supported by the microscope to direct the sight of the user toward eye contacting element 26. A light shield 50 is supported over palpator 10 to prevent light from lamp 28 affecting the operation of optical transducers employed in the palpator for measuring the force applied to, and the displacement of, the eye contacting element, as will be described hereinafter.

Figure 2:
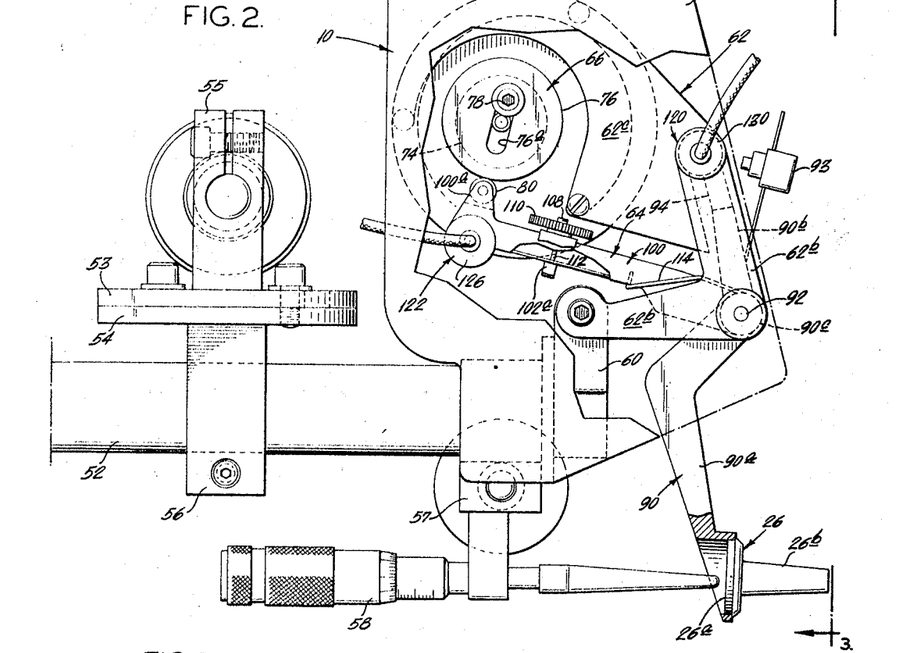
FIG. 2 is an enlarged plan view, partially in section, taken along line 2—2 of FIG. 1.
Figure 8:
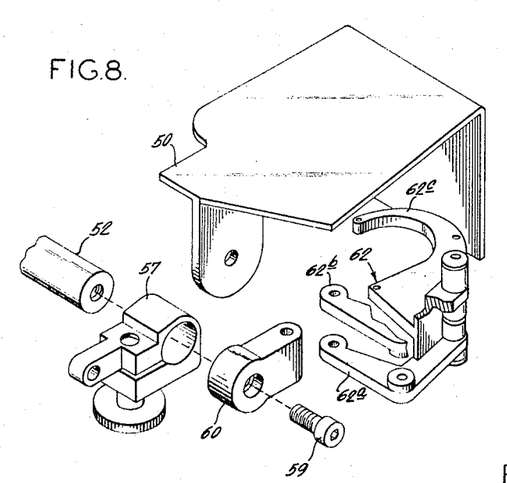
FIG. 8 is an exploded perspective view with parts broken away of the support structure for the palpator of FIG. 4.

The palpator of the invention is supported at one end of a support rod 52 as shown in FIGS. 1, 2 and 8. The rod 52 is supported by the stand through an adjustable connection provided by face plates 53 and 54 connected by brackets 55 and 56, respectively, to the top of the stand and the support rod, respectively. Face plates 53 and 54 are held together by any convenient means such as screws threaded through aligned openings in the plates. The plates may be rotated relative to one another by loosening of the screws to allow their movement in concentric slots in plate 53 so that the support rod and palpator may be rotated to a vertical position and secured to the stand for calibration of the palpator, to be described hereinafter.

Figure 3:
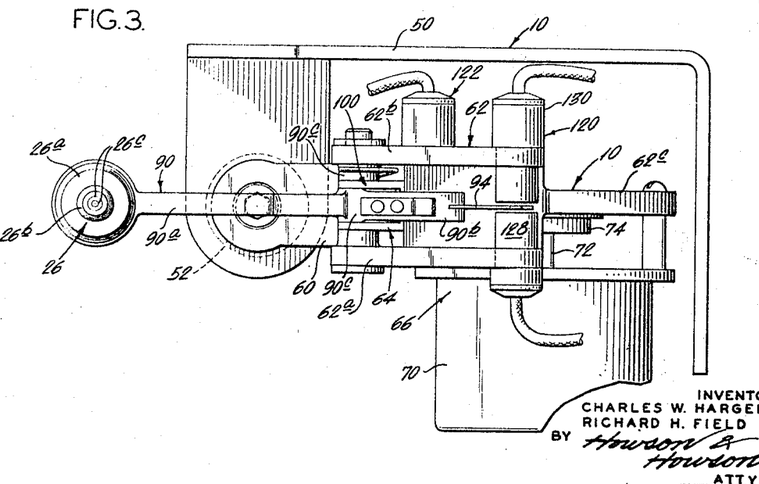
FIG. 3 is an enlarged front elevational view taken along line 3—3 of FIG. 2.

The support structure for palpator 10 at the end of rod 52 is best seen in FIGS. 2 and 8. Rod 52 supports at its end a pinch bracket 57 clamped around the rod adjacent the end to support a micrometer 58 used in calibration of the palpator. There is also secured to the end of rod 52 as by screw 59 a fitting 60, which supports a mounting bracket 62. The light shield 50 is fixed to rod 52 between the fitting 60 and the rod. Mounting bracket 62 has legs 62a and 62b secured at their remote ends to opposite sides of fitting 60 as by a screw and has an arm 62c extending from the common support for the legs in the opposite direction as can be seen in FIGS. 2, 3 and 8. Mounting bracket 62 supports a first portion of the palpator generally designated 64, as seen in FIGS. 2 and 4, midway along and between legs 62a and 62b and supports a second portion of the palpator generally designated 66 from arm 62c. The first portion of the palpator comprises functionally a force-responsive means 64 coupled to the eye contacting element for receiving varying forces and for applying a varying force to the eye of the patient by way of the eye contacting element. The second portion 66 of the palpator comprises functionally a means for applying a varying force to the force-responsive means in a cyclic manner during a predetermined interval of time.

More specifically, as can be seen in FIGS. 2, 3 and 4, the second portion 66 comprises an electric motor 70 mounted to arm 62c of mounting bracket 62 by suitable screws threaded into the motor housing, as shown in FIG. 2, so that the motor extends downwardly from the mounting bracket. Motor 70 has its drive shaft 72 arranged to extend vertically upwardly. Attached to the drive shaft 72 is a disc 74 which rotates within a cut-out portion of arm 62c of mounting bracket 62. A circular cam member 76 rests on disc 74 with the drive shaft 72 extending through a diametrically oriented slot 76a. A screw 78 extends through slot 76a and is threaded into disc 74 so that the head of the screw holds the cam member fixed relative to the disc and drive shaft. Cam member 76 is adjustable relative to the disc and drive shaft to a new position by loosening screw 78 and sliding the cam member longitudinally of the slot to a new position relative to drive shaft 72 and screw 78. In this manner an eccentric cam driver is provided for moving the force-responsive means 64 through cam follower 80 on the force-responsive means. The force-responsive means converts the cyclic movement of the eccentric cam to a varying force applied to the eye by the eye contacting element.

Means (not shown) are preferably provided for varying the speed of the motor in a conventional manner so that the duration of the cycle used in applying the varying force to the force-responsive means through the cam member can be varied in a predetermined manner. Since the eye has viscoelastic properties the interval over which the varying force is applied to the eye is important in determining the stress-strain characteristics of the eye. The capability of varying the time cycle is important to ophthalmologists since at slow driving speeds of the cam member the palpator may be used to provide a form of tonography which is related to the rate of fluid outflow. The rheological response of the tissues of a viscoelastic substance depends upon the application rate of the forcing function. In the present instance by use of the eccentric cam to apply the varying force to the force-responsive means, providing a sinusoidal forcing function placing the eye under stress, the resulting phase shift of the strain exhibited by the viscoelatstic specimen can be derived for the varying force applied. By measuring and correlating the varying force with the resulting displacement of the eye, a complete stress-strain function for the eye can be derived.

Force-responsive means 64 provides a coupling between the means 66 for applying the varying force and the eye contacting member 26, so that the eye contacting element against the eye is displaced from its initial position a distance determined by the magnitude of the force exerted by the eye. The force-responsive means in the present instance, as shown in FIGS. 2, 3 and 4, comprises a lever member generally designated 90 having interconnected arms 90a and 90b pivotally supported at their interconnection 90c by pin 92 which is supported by L-shaped arms 62a and 62b of bracket 62 at the bend of each of the arms. The lever member is pivoted about the pin on precision bearings to reduce friction and provide the utmost freedom of movement of lever 90. Arm 90a at its free end supports eye contacting element 26 within a ring provided at the end of arm 90a which is adapted to receive plate portion 26a of the eye contacting element. Arm 90b at its free end supports an optical shutter 94 used in connection with measuring the displacement of the lever and eye contacting element, as will be explained hereinafter. Arm 90b has supported therefrom a balancing counterweight 93, as seen in FIG. 2, to accurately balance the lever about interconnection 90c.

Lever member 90 is driven about the pivotal support by a cantilever leaf spring 96 supported at the interconnection of arms 90a and 90b and extending outwardly therefrom a distance toward the eccentric cam member 76. There is supported at the free end of the cantilever leaf spring an optical shutter 98 used in connection with measuring the varying force applied by the cam member, to be explained more fully hereinafter.

There is also pivotally supported by pin 92 a forcing lever 100 which is channel-shaped in cross section with its sides extending above and below cantilever leaf spring 96, as shown in FIGS. 4 and 5. Pin 92 is inserted through extended portions of the sides at one end of the arm. Forcing lever 100 has a pair of horizontally extending projections 100a and 100b which extend toward cam member 70 to support rotatable cam follower 80 therebetween, as shown in FIG. 4. The cam follower 80 supported by the forcing lever is biased against the eccentric cam 76 by a wire spring 114, which has one end wrapped around a projection of L-shaped bracket arm 62b and its other end engaging the forcing lever to bias the lever toward the cam.

The cantilever leaf spring 96 is adjustably held to the forcing lever 100 by a slidable adjustment bracket 102, which is bent around the channel-shaped lever with one end 102a extending into the channel and against one side of the cantilever spring 96. Adjustment bracket 102 is attached to the central portion 100c of the forcing lever for movement along a longitudinally extending slot 104 in the central portion. More specifically, bracket 102 is held to lever 100 by a slide block 106 on the channel side of central portion 100c and a screw 108 extending through slot 104 with a hand wheel 110 threaded on the screw for holding the parts together. Slide block 106 has a pin 112 extending therefrom into contact with the other side of the cantilever leaf spring 96, so that the leaf spring is held between end 102a of the bracket 102 and pin 112. It should be appreciated that different size leaf springs with any desired number of leaves could be employed to provide any desired spring constant.

In operation of electromechanical palpator 10, when the motor is energized cam member 76 will be eccentrically rotated by drive shaft 72 and engage cam follower 80. In the preferred use of the palpator, it is desirable to have the motor operate for one revolution of the drive shaft and stop, which corresponds to movement of the eye contacting element to derive a complete stress-strain function of the eye for the varying force applied by the cam. Operation of the motor in this manner may be provided by any conventional relay circuit connected in the motor circuit. A typical time for a complete cycle of the cam is one second. As the cam follower is moved by the eccentric cam, driving lever 100 will be moved in a varying manner to exert a varying force through pin 112 to the cantilever spring 96. The varying force exerted on the cantilever spring is transmitted to lever member 90 at its interconnection 90c between its arms. The force thus applied to lever member 90 pivots the lever member to apply a force through arm 90a and the eye contacting element to the eye of the patient. The eye contacting element moving against the eye is displaced by the force exerted through the cantilever spring a distance determined by the opposing intraocular pressure of the eye. Thus, for the varying force applied by the cantilever spring and transmitted through the eye contacting element, a measure of corresponding displacement of the cornea of the eye is derived by the movement of the arms of the lever member.

In accordance with the present invention, transducers are employed which are associated with the cantilever spring 96 and lever member 90, to measure the applied force of the spring and resulting displacement of the lever member for the varying force applied. The measure of applied force, which represents stress of the eye, is derived from the movement of optical shutter 98 attached to the end of the cantilever spring, and the measure of the resulting displacement, which represents strain of the eye, is derived from the movement of optical shutter 94 on the free end of arm 90b of the lever member. The displacement and force measurements are independent of one another. Transducers generally designated 120 and 122 are associated with the optical shutters 94 and 98, respectively, for providing the indication of the respective quantities of displacement and force. Transducer 122 is provided by a photosensor 124, such as made by Clairex Inc. of New York, N.Y., having a pair of photoresistive elements 124a and 124b, as shown in FIGS. 4 and 6. The photosensor 124 is supported in an opening in one side of channel-shaped forcing lever 100 and a light source 126 is supported in an opening in the other side of the channel-shaped forcing member such that light from light source 126 is picked up by the photosensor 124. The amount of light picked up by the photosensor is varied by optical shutter 98 at the end of the cantilever spring 96, which moves optical shutter 98 between photosensor 124 and light source 126. It will be recalled that the cantilever leaf spring will be deflected by the pin 112 an amount proportional to the force exerted on the eye. The arrangement of transducer 122 measures the deformation of the spring relative to lever 100. This measurement provides an indication of the force exerted on the eye by the eye contacting element on lever 90, since the spring has a deformation by its characteristic which is proportional to applied force and the photosensor measures its deformation relative to its undeflected position.

In a similar manner, the transducer 120 is provided by a photosensor 128 supported in an opening in arm 62a and a light source 130 supported in an opening in arm 62b of bracket 62 such that light from light source 130 is picked up by the photosensor. The amount of light picked up by photosensor 128 is varied by optical shutter 94 at the end of arm 90b of the lever member moving between photosensor 128 and light source 130. As with photosensor 124, preferably photosensor 128 is provided with two photoresistive elements 128a and 128b to convert the light energy variations to electrical current variations to provide an indication of the movement of the associated optical shutter.

Figure 14:
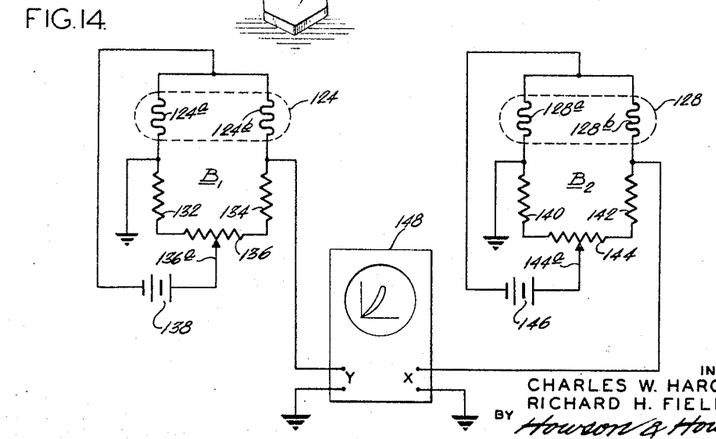
FIG. 14 is a schematic circuit diagram illustrating the transducers and circuitry for measuring the force applied to and the displacement of the eye contacting element and showing their connection to an oscilloscope for displaying the dynamic stress-strain characteristic trace for an eye.

The photoresistive elements of the photosensors 124 and 128 are connected in bridge circuits B1 and B2, respectively, as shown in FIG. 14. Photoresistive elements 124a and 124b are connected in adjacent arms of bridge circuit B1. The other two arms of bridge circuit B1 contain resistors 132 and 134, respectively. The adjacent arms of the bridge circuit containing resistors 132 and 134 are interconnected by a variable resistor 136 whose tap 136a provides a terminal between the adjacent arms. Across the bridge at the terminal between the photoresistive elements 124a and 124b and between resistors 132 and 134 at the center tap 136a of resistor 136 there is connected a battery 138 for supplying power to the bridge B1. The intermediate terminal between photoresistive element 124a and resistor 132 is connected to electrical ground and the intermediate terminal between photoresistive element 124b and resistor 134 provides the output terminal of the bridge circuit.

Photoresistive elements 128a and 128b are connected in adjacent arms of bridge circuit B2 in a manner similar to bridge circuit B1. The other two arms of bridge circuit B2 contain resistors 140 and 142, respectively. The adjacent arms of the bridge circuit containing resistors 140 and 142 are interconnected by a variable resistor 144 whose tap 144a provides a terminal between the adjacent arms. Across the bridge at the terminal between the photoresistive elements 128a and 128b and between resistors 140 and 142 at the center tap 144a of resistor 144, there is connected a battery 146 for supply power to the bridge B2. The intermediate terminal between photoresistive element 128a and resistor 140 is connected to electrical ground and the intermediate terminal between photoresistive element 128b and resistor 142 provides the output terminal of bridge circuit B2.

The output of the bridge circuit B1, which provides an indication of force applied to the eye, is connected to the Y-axis amplifier and deflection circuit of a conventional direct-coupled oscillograph or plotting device 148 and the output of bridge circuit B2, which provides an indication of the displacement of the eye resulting from the force, is connected to the X-axis amplifier and deflection circuit of oscillograph 148 so that an orthogonal-coordinate display of force versus displacement, corresponding to stress versus strain of the eye, will be drawn. Through electrical amplification adjustments, the trace along each axis can be extended or shortened. Resistors 132 and 134 and resistors 140 and 142 may be of equal value or slightly unequal value to achieve a desired point for the intersection of the X and Y axis of the oscillograph. Variable resistors 136 and 144 are of a value to provide for fine adjustment in the location of the X and Y axis point of intersection. All electrical circuits of FIG. 14 are direct coupled as is the entire electronic and optical system, so that the response of the system will be independent of time in responding to the varying force and displacement.

The electrical circuit for the light sources 126 and 130 are not shown but may employ a conventional steady supply of current, such as provided by a conventional transistorized regulator circuit operated from batteries, so as to provide constant power output to operate the light sources. The photoresistive elements in the photosensors 124 and 128 vary in resistance in accordance with the amount of light impinging thereon, so that the outputs of their respective bridge circuits are varied accordingly. As previously stated, the optical shutters move between the photosensors and the associated light sources to vary the light picked up by the photoresistive elements to provide an indication of the force and displacement of the cantilever spring and lever member, respectively. The optical shutters are preferably made of a shape to cooperate with the photosensitive elements to obtain a linear output of the bridge circuits in accordance with movement of the shutters representative of force and displacement of stress and strain. In the present instance, optical shutter 98, and optical shutter 94 which is like it, is generally V-shaped over the photosensor with one leg of the V being supported along its side from the end of the cantilever spring, as seen in FIGS. 4 and 6. This general configuration is employed so that, for example, the remote leg 98a of the V covers photoresistive element 124a from direct illumination from light source 126 while the other photoresistive element 124b is uncovered in the opening between the legs of the V and exposed to direct illumination from light source 126. As optical shutter 98 moves from the solid line position to the alternative position shown in dashed lines in FIG. 6, caused by an applied force to the cantilever spring, the remote leg 98a of the optical shutter uncovers photoresistive element 124a previously covered, and the vertex of the V-shaped optical shutter now covers photoresistive element 124b. This V-shaped configuration of the optical shutters exposes and covers the respective photoresistive elements progressively, as the varying force is applied to the cantilever spring and the resulting varying displacement of the lever member occur. Thus, the angular shape of the optical shutter in covering and uncovering the photoresistive elements in each photosensor provides greater sensitivity of the photosensor and the optimum electrical range of the photoresistive elements, thereby providing the optimum range of signal change from the bridge circuit. In a similar manner, optical shutter 94 is of the same general V-shaped configuration as optical shutter 98 to provide a wide range of sensitivity for measuring resulting displacement of the lever member. It should be appreciated that other configurations of the optical shutters could be designed to produce a special response, such as, linearizing any of the several mechanical, optical and electrical relationships which may require correction for display purposes on the oscillograph.

Calibration of the electromechanical palpator to correlate the displacement of optical shutter 98, representative of force or stress, with the output of bridge circuit B1, and the displacement of optical shutter 94, representative of displacement of the eye or strain, with the output of bridge circuit B2, is provided in the following manner. To calibrate the palpator for force applied to the cantilever spring, the palpator is upended by loosening the screws interconnecting plates 53 and 54 and turning support rod 52 to a vertical position so that the arms 90a and 90b are disposed in the position of a platform balance. The eccentric cam is rotated to a position of minimum displacement of the cam follower from the drive shaft for the setting of the eccentric cam. In calibrating the instruments for force applied, the input of the oscillograph for the displacement of shutter 94, which is normally plotted along the X-axis, is disconnected for each calibration along the Y-axis. Weights in incremental steps are placed on the eye contacting element as a platform balance and the resulting force of each increment of weight is determined through movement of optical shutter 98 over the photoresistive elements of photosensor 124.

The resulting electrical output of the bridge circuit B1 is noted along the Y-axis of the oscillograph. In this manner, calibration of the instrument for force applied to the cantilever spring is facilitated. Of course, the values of force exerted on the eye through the cantilever spring are chosen so that no damage is caused to the eye.

Calibration of the electromechanical palpator for displacement of the lever member moving the eye contacting element is performed through the use of micrometer 58 held by bracket 57. Bracket 57 is loosened and micrometer 58 is moved to the position shown in FIG. 2 where the micrometer may contact the back of the eye contacting element. In calibrating the palpator for displacement of the lever member and eye contacting element, the input to the oscillograph for movement of shutter 98, representing force, is disconnected for ease of calibration along the X-axis for displacement of the contacting element. The point of the micrometer is initially set against the back of the eye contacting element, and adjusted through increments of distance to move the eye contacting element and hence lever arm 90a toward the head frame 14, and the resulting displacement is indicated by optical shutter 94 moving over photosensor 128. The resulting electrical output of the bridge circuit B2 is noted along the X-axis of the oscillograph. In this manner, the oscillograph is calibrated for known increments of displacement of the eye contacting element.

Figure 9:
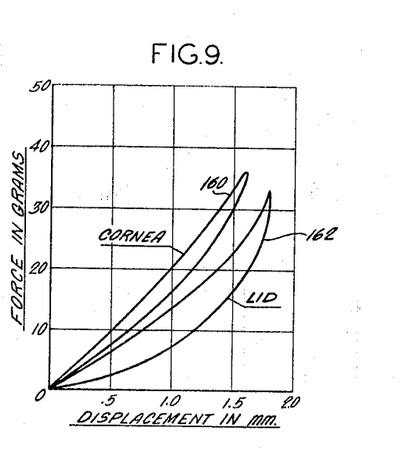
FIG. 9 is a graphical representation of stress-strain characteristic traces of the cornea of a living human eye and of the lid of the eye.

FIG. 9 is a schematic illustration of dynamic stress-strain traces designated 160 and 162 of a cornea and of a lid, respectively, as would be traced on the oscillograph as shown in FIG. 14. The term "signature" can be used to describe the stress-strain loops obtained for the individual's eye because there appears to be a high degree of uniqueness of shape from person to person. The cycle of application of force begins at the origin of the graph as calibrated with force and displacement both zero, and progress along each trace is in a clockwise direction. The viscoelastic properties of the eye are revealed by the open loop. This agrees with the energy considerations for any viscoelastic body which is compressed and then released. The compression work will be greater than the mechanical energy returned as the body relaxes. The loop traces are composed of the two halves of the palpation cycle, the compression stroke up to a stress maximum and the relaxation portion as the return path to the origin is traveled. The energy loss is the difference in area under the two curves, or precisely the area enclosed by the recorded trace. The openness of the loop of the signature or trace indicates the degree to which the specimen can be considered viscous. The close proximity of the compression and releases strokes of the trace is high for a specimen which is largely elastic. The electromechanical palpator thus provides the means for detecting pathology which is related to these characteristics, that is, highly viscous and highly elastic. It has been found that conditions such as glaucoma seem to be accompanied by the more viscous system.

In most cases, as illustrated in FIG. 9, the lid and cornea traces show similar shapes. The lid trace usually falls below the associated cornea trace because the tissues of the lid are softer and more viscous than the cornea. The tissue of the lid being more viscous, the lid trace has a larger open area than the cornea trace.

Figure 10:
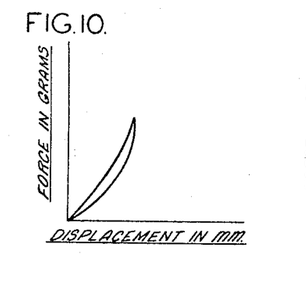
FIG. 10 is a graphical representation of the stress-strain characteristic trace of the cornea of an eye.
Figure 11:
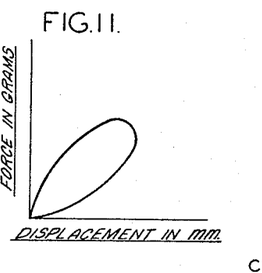
FIG. 11 is a graphical representation of the stress-strain characteristic trace of the cornea of another eye.
Figure 12:
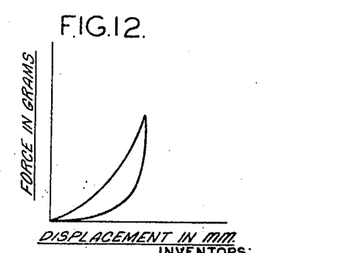
FIG. 12 is a graphical representation of the stress-strain characteristic trace of the cornea of still another eye.

FIGS. 10, 11 and 12 show typical dynamic stress-strain cyclic signatures or traces of corneas in different patients. FIG. 10 shows a typical trace of a healthy eye in which there is shown a relatively low slope characteristic, indicating low intraocular pressure, and a relatively small enclosed area within the loop. The signature of the cornea in FIG. 10 is representative of good tissue tonus.

The signature or trace of FIG. 11 shows a large openness of the loop, as compared to the trace of FIG. 10, and is illustrative of a large energy loss during the cycle of applying the varying force. This large energy loss seems to be characteristic of less healthy eye tissues. There has been found to be a correlation between a signature of the type shown in FIG. 11 and elevated intraocular pressure. A consideration of the combination of the slope and shape of the signature or trace is significant in diagnosing disease, such as glaucoma. For example, elevated intraocular pressure is always accompanied by a steep slope.

The signature in FIG. 12, although showing a large energy loss by the openness of the loop when compared to the trace of FIG. 10, shows a compression stroke trace which is concave downward, typical of most healthy eyes.

The signature of the eye is useful in assessing the condition of the eye's tissue and the geometrical structure of the eye. Since delicate geometrical structures are involved in the outflow system of the eye, the response of the eye which produces the signature is indicative of the soundness or malfunctioning of such structures.

It should be appreciated that the electromechanical palpator of the present invention has an important role to perform in the detection of glaucoma and other diseases of the eye. With the use of a conventional tonometer, a single measurement is made for one force applied to the eye, while the present electromechanical palpator provides a series of readings by applying predetermined varying force to provide a dynamic stress-strain function of the eye. In the past, error has been introduced into the readings of conventional tonometers due to cornea bending which interferes with the pressure reading associated with the eye. The information obtained from the dynamic stress-strain characteristic trace of the eye enables one to distinguish between intraocular pressure measurement and the factor of cornea bending. It will be appreciated by those skilled in the art that the capabilities of the palpator described fulfills the need for a precise instrument that is useful in a wide variety of applications to provide data of the stress-strain functions of specimens exhibiting viscoelastic properties.

While the invention has been described with particular reference to a specific embodiment thereof in the interest of complete definiteness, it should be understood that it may be embodied in a large variety of forms diverse from the one specifically shown and described without departing from the scope and spirit of the invention as defined by the appended claims.

We claim:

1. An electromechanical palpator for measuring the dynamic stress-strain characteristics of an eye, which comprises: an eye contactor adapted to contact said eye; means for urging said contactor against said eye with a varying force in a predetermined manner; and means for simultaneously measuring the varying force applied to the contactor and the varying displacement of the contactor produced by the force as the force varies.

2. The electromechanical palpator in accordance with claim 1 in which said means for measuring comprises a first means for deriving a first signal representative of said varying force and a second means for deriving a second signal representative of said varying displacement, and indicator means responsive to said first and second signals for displaying said first and second signals simultaneously.

3. The electromechanical palpator in accordance with claim 1 in which said means for urging said contactor comprises a movable driving member and resilient means for coupling said driving member to said contactor.

4. The electromechanical palpator in accordance with claim 3 in which said means for measuring the force comprises means for detecting the deformation of said resilient means.

5. The electromechanical palpator in accordance with claim 1 in which said means for urging said contactor comprises means for producing a cyclically varying force.

6. An electromechanical palpator for measuring the dynamic stress-strain characteristics of an eye, which comprises: a contacting member adapted to contact said eye; force-responsive means coupled to said contacting member; said force-responsive means being responsive to a varying force applied thereto to apply a varying force to said contacting member; means for applying a varying force to said force-responsive means in a predetermined manner during a predetermined interval of time; and means for simultaneously measuring said varying force applied by said force-responsive means to provide an indication of the stress applied to said eye and the varying displacement of said contacting member to provide an indication of the strain of said eye, whereby a complete stress-strain function of said eye may be derived for said varying force applied.

7. The electromechanical palpator in accordance with claim 6 in which said means for applying said varying force includes actuator means for applying said varying force in a cyclic manner and said means for measuring simultaneously provides indications of said stress and said strain of said eye during the cycle.

8. The electromechanical palpator in accordance with claim 6 in which said means for applying said varying force includes a motor, a rotary cam driven by said motor, a cam follower coupled to said force-responsive means for applying the movement of said rotary cam to said force-responsive means, and means for biasing said cam follower toward said cam so that said cam follower follows the movement of said cam.

9. The electromechanical palpator in accordance with claim 6 in which said force-responsive means comprises a resilient member for receiving said varying force and for applying a varying force to said eye through said contacting member to produce the displacement of said contacting member.

10. The electromechanical palpator in accordance with claim 9 in which said resilient member comprises a cantilever spring coupled at one end to said contacting member and adapted to receive said varying force, and said contacting member comprises a lever pivotally supported at one end and having a free end with a contacting element adapted to contact said eye, said lever being coupled to said cantilever spring at said pivotal support for receiving a varying force.

11. The electromechanical palpator in accordance with claim 10 in which said means for measuring said varying force applied by said cantilever spring comprises a light source, a photosensitive device adapted to pickup light from said light source, an optical shutter supported by said cantilever spring and adapted to move between said light source and said photosensitive device to vary the amount of light picked up by said photosensitive device indicative of said varying force applied to said eye and circuit means electrically connected to said photosensitive device for providing a signal indicative of said varying force applied to said eye.

12. The electromechanical palpator in accordance with claim 10 in which said means for measuring the displacement of said contacting member comprises a light source, a photosensitive device adapted to pickup light from the light source, an optical shutter supported by said lever and adapted to move between said light source and said photosensitive device to vary the amount of light picked up by the photosensitive device indicative of the displacement of said lever, and circuit means electrically connected to said photosensitive device for providing a signal indicative of the displacement of the contacting element moving against said eye.

13. The electromechanical palpator in accordance with claim 6 in which said contacting member comprises an arm pivotally supported at one end and having a free end with a contacting element adapted to contact said eye; and said force-responsive means comprises a cantilever spring attached to the arm at the pivotal support, and a lever pivotally supported at said pivotal support, said lever having a driving element engageable with said cantilever spring and being moved by the means for applying said varying force.

14. The electromechanical palpator in accordance with claim 13 in which said driving element is adjustable in position along said lever for changing the range of applied force to said cantilever spring.

15. The electromechanical palpator in accordance with claim 14 in which said means for measuring said varying force comprises a light source supported by said lever, a photosensitive device supported by said lever and adapted to pickup light from said light source, an optical shutter supported by said cantilever spring and adapted to move betweeen said light source and said photosensitive device to vary the amount of light picked up by said photosensitive device indicative of said varying force applied to said eye, and circuit means electrically connected to said photosensitive device for providing a signal indicative of said varying force applied to said eye.

16. The electromechanical palpator in accordance with claim 14 in which said means for measuring the displacement comprises a light source, a photosensitive device adapted to pickup light from said light source, an optical shutter supported by said arm and adapted to move between said light source and said photosensitive device to vary the amount of the light picked up by said photosensitive device indicative of the displacement of said arm, and circuit means electrically connected to said photosensitive device for providing a signal indicative of the displacement of the contacting element moving against said eye.

17. An electromechanical palpator for measuring the dynamic stress-strain characteristics of an eye, which comprises: a support frame; an eye contacting element adapted to contact said eye; force-responsive means coupled to said eye contacting element and supported by said frame for movement relative thereto, said force-responsive means being adapted to receive a varying force applied thereto to apply a varying force to said eye contacting element; means for applying a varying force to said force-responsive means in a predetermined manner during a predetermined interval of time; and means for simultaneously measuring said varying force applied by said force-responsive means to provide an indication of the stress applied to said eye and the varying displacement of said eye contacting element to provide an indication of the strain of said eye; whereby a complete stress-strain function of said eye may be derived for said varying force applied.

18. The electromechanical palpator of claim 17 in which said means for applying said varying force includes actuator means for applying said varying force in a cyclic manner and said means for measuring simultaneously provides indications of said stress and said strain of said eye during the cycle.

19. The electromechanical palpator of claim 17 in which said eye contacting element is transparent and is provided with a plurality of concentric circles on the eye contacting surface so that a microscope can be employed to view said eye through said eye contacting element for accurate positioning of said eye contacting element on a desired area of said eye and so that said concentric circles provide an indication of the applanation of said eye by said contacting element.

20. The electromechanical palpator for measuring the dynamic stress-strain characteristics of an eye, which comprises: a support frame; an eye contacting element adapted to contact said eye; an arm pivotally supported at one end by said frame and adapted to carry said eye contacting element at its free end; force-responsive means including a resilient member coupled to said arm at said pivotal support for receiving a varying force and for applying a varying force to said arm to produce displacement of said arm and contacting element against said eye; means for applying a varying force to said force-responsive means in a predetermined manner during a predetermined interval of time; and means for simultaneously measuring said varying force applied by said resilient member to provide an indication of the stress applied to said eye and the varying displacement of said eye contacting element to provide an indication of the strain of said eye, whereby a complete stress-strain function of said eye may be derived for said varying force applied.

21. The electromechanical palpator of claim 20 in which said resilient member includes a cantilever spring attached at one end to said arm at the pivotal support, said force-responsive means further comprising a lever pivotally supported by said frame at said pivotal support, said lever having a driving element engageable with said cantilever spring, said lever being moved by said means for applying said varying force with the force being transferred to said cantilever spring through said driving element.

22. The electromechanical palpator of claim 21 in which said means for applying said varying force comprises a motor, a rotary cam driven by said motor, and a cam follower supported by said lever for applying the movement of the rotary cam to said lever, and means for biasing said lever toward said cam so that said cam follower follows the movement of said cam.

23. The electromechanical palpator of claim 21 in which said means for measuring said varying force applied by said cantilever spring comprises a light source supported by said lever, a photosensitive device supported by said lever and adapted to pickup light from said light source, an optical shutter supported by said cantilever spring and adapted to move between said light source and said photosensitive device to vary the amount of light picked up by said photosensitive device indicative of said varying force applied to said eye, and circuit means connected to said photosensitive device for providing a signal indicative of said varying force applied to said eye.

24. The electromechanical palpator of claim 21 in which said means for measuring the displacement of said eye contacting contacting element comprises a light source supported by said frame, a photosensitive device supported by said frame and adapted to pickup light from said light source, an optical shutter supported by said arm and adapted to move between said light source and said photosensitive device to vary the amount of light picked up by said photosensitive device indicative of the displacement of said arm, and circuit means electrically connected to said photosensitive device for providing a signal indicative of the displacement of said eye contacting element moving against said eye.

25. A method of measuring the dynamic stress-strain function of an eye by means of a force-responsive member adapted to contact said eye and being movable in a predetermined manner, the method comprising the steps of: applying a varying force to said force-responsive member in a cyclic manner during a predetermined interval of time; measuring said varying force to provide an indication of the stress applied to said eye; and measuring the resulting displacement of said force-responsive member as said force-responsive member moves against said eye to provide an indication of the strain of said eye; whereby the dynamic stress-strain function of said eye may be derived for said varying force applied.

References Cited

UNITED STATES PATENTS

| | | | |
|---|---|---|---|
| 3,049,001 | 8/1962 | Mackay et al. | 73—80 |
| 3,070,997 | 1/1963 | Papritz et al. | 73—80 |
| 3,330,152 | 7/1967 | Mackay | 73—80 |
| 3,359,789 | 12/1967 | Forse | 73—80 |

RICHARD C. QUEISSER, *Primary Examiner.*

J. K. LUMSFORD, *Assistant Examiner.*